Jan. 21, 1969 H. C. HOGENCAMP 3,423,747

THEFT PREVENTION DEVICE

Filed Aug. 3, 1965

INVENTOR.

*Harold C. Hogencamp*

United States Patent Office 3,423,747
Patented Jan. 21, 1969

3,423,747
THEFT PREVENTION DEVICE
Harold C. Hogencamp, Smiths, Ala.
(Rte. 2, Box 486, Phenix City, Ala. 36867)
Filed Aug. 3, 1965, Ser. No. 476,931
U.S. Cl. 340—280 2 Claims
Int. Cl. G08b 13/00

ABSTRACT OF THE DISCLOSURE

The invention comprises a self-powered alarm device contained within an electrical appliance such as a television receiver, for producing an audible signal upon an attempted theft of the appliance, the alarm device utilizing the electrical continuity of a ground loop to inhibit the sounding of the alarm, the ground loop being established through the house wiring to which the appliance is connected by way of the appliance power cord and a separate grounding connection such as an antenna transmission line.

The presently disclosed invention relates to a device for guarding television receivers and the like against theft. It is of particular usefulness to motels and other such places and is an improvement over previously known arrangements used for this purpose.

Theft of television receivers from motel rooms is a threatening and increasing crime in these United States. Since there are well over 60,000 motels in this country and in the order of some 3,000,000 television receivers in use in these motels, each set costing in the range of $100 to $150 the need for protection of these many millions of dollars of investment against potential theft will be readily apparent. An important factor leading to the massive theft of television receivers is the ready resale market and easy disposal to pawn shops at greatly reduced prices. Because of the muti-millions of television receivers in use in the United States it becomes practically impossible to trace or recover stolen sets.

The need for a near-foolproof device to protect television receivers against theft, particularly from motels, is shown by articles in trade magazines and by devices already on the market.

One such antitheft device now being marketed utilizes a key-locked box installed in each motel room mounted over the electric power outlet and into which the television power cord is plugged. When either this power cord or the antenna lead is unplugged or cut an alarm is set off in the motel room. This alarm is, in the words of the manufacturer, a "loud buzzer" in the room or a flashing light over the door and continues to operate until the box is opened by the key and the device reset.

In another variation requiring a much more complicated installation a buzzer sounds in the motel office and a signal light on a switchboard panel indicates numerically which room the set is being stolen from. Such indication in the office requires individual signal wiring from each room and this type of installation can become extremely costly in a motel having a great number of rooms. Cost becomes an all-important factor since cost versus percentage of losses determines the true value of the protective device. The cost-per-unit of the device herein described is extremely low.

The previously described prior-art and presently marketed arrangements can of course be combined thus setting off alarms in the room, outside the door, and in the motel office—but at added cost.

However, regardless of cost, these previously known arrangements have certain inherent disadvantages which the device of the present invention does not have.

As examples: It is an accepted fact that the television receiver thief operates in this manner: He puts all of his personal belongings (suitcases, etc.) into his car; leaves the car door or trunk open, as well as the motel room door; carefully looks around to be sure no one is watching; dashes back into the room, unplugs the TV set, grabs it and carries it to his car; then quickly drives off.

In such case, and with the previously known and described protective devices he could quickly close the motel room door, thus effectively deadening the sound of the "loud buzzer" since most motel rooms are near-soundproof and he could then easily drive off with the stolen television set before the clerk in the motel office could react and go to the room from which the set was being stolen. Further, with such devices, if the electric power supply failed or a fuse was purposely "blown out" by the thief in the room from which the TV set was being stolen these previously known alarm devices would become inoperative. The device disclosed in the present invention would act—it would continue to be effectively operative regardless of power failure. However—and a most important feature of the present invention—no alarm would be set off simply by reason of such power failure.

The novelty of the present invention is that the alarm set off by attempted theft of a television receiver is set off INSIDE THE TELEVISION RECEIVER ITSELF. It is a loud and attention-getting alarm and continues to sound for as long as several hours if the thief is not "scared off" but continues on with his stealing of the alarm-giving TV set—or until properly shut off by reinserting the TV electric power cord into the electric outlet.

With the foregoing in mind the primary object of my invention is the provision of new and improved methods and means for producing a signal-alarm or warning of attempted theft of a movable, electrically connected, object such as a television receiver or the like.

A second important object is to provide a method and means for preventing such signal-alarm device from sounding in case of electric power mains failure but to still maintain its useful operativeness regardless of whether the main electric power supply is on or off.

Other objects and advantages will become apparent from the following disclosure.

Since the purpose of the herein disclosed invention is to prevent, deter or guard against theft and can so advantageously be used to protect television sets, I choose to call this device TEL GARD.

For the purpose of description a straightforward, simplified and preferred arrangement of apparatus is shown in the accompanying drawings. It will be obvious that other components can be substituted to give the desired result. The complete device, aside from connecting wires, is mounted within the article or object to be protected.

Figure 1:
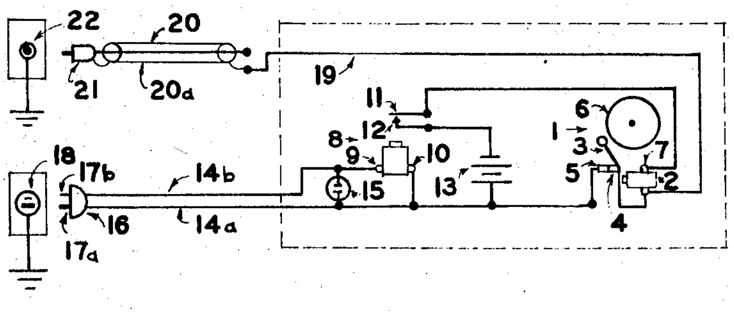
FIG. 1 is a circuit diagram of one arrangement which is complete in itself.

In FIG. 1 of the drawings: 1 represents an electric bell, such as a common doorbell, including energizing call 2, vibrator with hammer 3, contactor 4 attached to vibrator 3, electrical contact 5, and gong 6. One end of the wire winding of coil 2 is designated as 7, while the other end of the coil is electrically connected to contactor 4.

An electric relay 8 of standard construction with coil connections 9 and 10, magnetically energizes a single-pole, single throw contactor having electrical contact points 11 and 12, respectively, which are normally closed when the relay coil is not energized.

A self-contained power supply to energize the electric bell 1 is shown as battery 13 which may be small flashlight cells. A pair of wires or a 2-wire electric supply cord 14_a_, 14_b_ is connected to the relay coil connections 9 and 10 and also to electric outlet 15. Cord 14_a_, 14_b_ terminates and is connected to polarized electric plug 16 having prongs 17$a$ and 17$b$ which insert into a standard polarized electric outlet receptacle 18, normally termed a wall-outlet. Use of a third connecting wire 19 will be further described. Other interconnecting wires of the circuit shown are not designated by number but do complete the necessary electrical circuit connections required for operation of the TEL GARD device.

In many multiunit installations, when the device of this invention is used to protect television sets against theft, television antenna distribution systems are used and in such cases a coaxial cable is commonly employed to connect the television receiver to the antenna system outlet. Such a coaxial cable is here shown and designated as 20, with the outer shield 20$a$ connected by means of coaxial TV plug 21 to the grounded connection of coaxial TV outlet 22. Detailed description of the use made of such coaxial cable, where used, will be given later.

Referring to the circuit diagram of FIG. 1 of the drawings, my TEL GARD device operates in the following manner:

When polarized electric plug 16, attached to wires 14$a$ and 14$b$, is inserted in electrical outlet 18 the relay 8 is energized and contact points 11 and 12 are caused to open; also electrical outlet 15 becomes activated and the two-contact electric plug attached to the supply cord of the tlevision receiver (not shown) is removed from the wall outlet and inserted into this outlet 15, positioned within the set, thus, the required electric power is provided and is available to the television set the same as heretofore.

Preferably after plug 16 has been inserted and relay 8 activated, connection is made to battery 13. However, since contact points 11 and 12 are open because of the energizing of relay 8, the circuit between battery 13 and the coil 2 of bell 1 is incomplete and the bell remains inactivated.

The television receiver itself is in normal operating condition since plug 16, cord 14$a$, 14$b$ and outlet 15 simply act as an extension cord and the TEL GARD device is effectively in operation and ready to signal any attempted theft of the television receiver.

In order to steal the receiver, plug 16 must be removed from electrical outlet 18 or wires 14$a$ and 14$b$ must be cut or disconnected. At the instant plug 16 is removed or either wire 14$a$ or 14$b$ is cut or disconnected relay 8 will no longer be energized, contact points 11 and 12 will therefore close and the electrical circuit between battery 13 and coil 2 will be completed, thus energizing bell 1 and causing it to ring. Since the entire TEL GARD device is located within the case of the television receiver the bell will continue to ring even if the receiver is moved until it is in some way deenergized, as by reinserting plug 16 into outlet 18, or until battery 13 loses its power after an appreciable period of time.

It is not conceivable that a potential thief would carry out a television receiver under such conditions and with the signal-alarm sounding loudly from within the receiver itself, even while it is being moved.

In effect the foregoing description tells completely of the simplicity of operation of the TEL GARD device as an alarm-giving preventative or guard against theft. However a most important and most necessary feature has not yet been described, although it is shown in the drawing.

In the description up to this point the device would have a most serious draw-back or deficiency. If there was an electric power failure, general or just at the outlet 18, the relay 16 would of course become deenergized and the alarm would sound just as previously described. Most especially in case of a general power failure this in itself would be almost catastrophic—considering the possibility of alarms sounding in perhaps 100 or even more rooms in the larger motels if there was a general power failure at perhaps 2 a.m.

Therefore, the method and means of eliminating this failing is considered an essential part of the invention and operates in a most effective but simple manner as follows:

Wire 14$a$ of the electric power cord, being the wire connected to the grounded side of the electric power supply through polarized plug 16 (prong 17$a$) and polarized electric outlet 18 and connected at the other end to the relay-coil wire termination 10 and also to one side of outlet 15 is also connected, as shown, in the circuit diagram of the drawing, to one terminal of battery 13 and thence to contact 5 of the bell 1. An additional wire 19 is separately connected to the grounded side of the electric power supply of outlet 18. This may be done by direct connection of wire 19 to a screw which fastens the plate of outlet 18 to the grounded conduit box (not shown but standard electrical wiring procedure) or in other such manner. Most convenient when a television antenna distribution system is employed is to connect wire 19, internal of the set or at the proper external antenna connection of the television set to the shield 20$a$ of the coaxial cable 20 which in turn connects to the grounded side of television outlet 22 by means of coaxial plug 21.

Regardless of the exact means of connection it will be seen that joining wires 14$a$ and 19 at their external ends by grounding both wires effectively closes the circuit between the two ends of battery 13 and coil 2 of the bell 1, without need or use of connection through contacts 4 and 5. Thus the coil 2 will be continuously energized, rather than intermittently, and will not vibrate or ring when relay 8 is de-energized and contacts 11 and 12 are closed. Obviously the circuit will still remain incomplete so long as relay 8 remains energized and therefore there will be no drain at all on battery 13 unless contacts 11 and 12 do become closed.

With the entire circuit and arrangement of the device completed as now described there will be no general alarm in case of power failure and the TEL GARD device will additionally operate in this manner:

In case of power failure at outlet 18, relay 8 will become deenergized and contacts 11 and 12 will close, thus completing the circuit between battery 13 and coil 2 of bell 1, but excluding vibrator contacts 4 and 5 from the circuit. Vibrator 3 will be magnetically pulled and held by energized coil 2 but will not continue to vibrate and ring the gong 6 of the bell. Obviously during such time as the power failure continues coil 2 will drain power from battery 13 but this is not considered greatly harmful unless such power failures reoccur very often or continue for a length time in which case the battery would have to be replaced or recharged. However, the desired result is obtained since no multitudious or general alarm would be sounded.

On the other hand, regardless of whether the main power supply of outlet 18 is on or off, removal of plug 16 or cutting or disconnecting wires 14$a$ and 14$b$ (necessary in order to steal the television set) will still cause the signal alarm to sound since simultaneously it will open the circuit formed by wires 14$a$ and 19 and with contacts 11 and 12 of relay 8 closed the vibrator contacts 4 and 5 will again become operative and cause the bell to ring.

It will be obvious that although simplified apparatus is shown in the drawing for purpose of description that numerous changes and substitutions might readily be made without impairing the invention. By example: Relay 8 could be operative from A.C. or D.C. power of any desired frequency or voltage, with or without a rectifier or a solid-state relay could be employed; the self-contained power supply, shown as a simple battery 13 could be a rechargeable battery and charging means could then be included; a horn, siren or electronic sound producing device can be substituted for bell 1; and so on.

Figure 2:
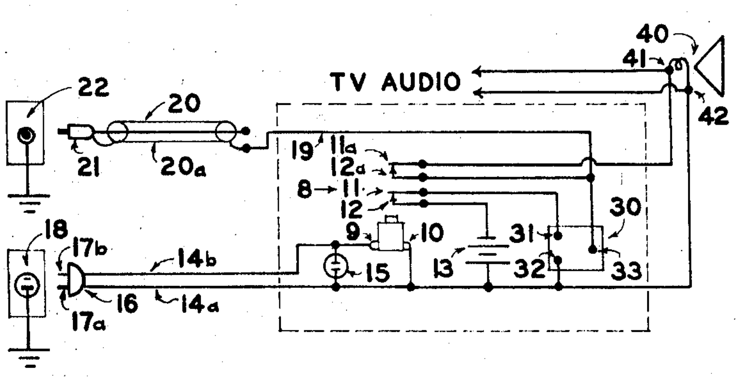
FIG. 2 shows a modification by which the loud speaker of the television receiver is utilized.

In the modification shown in FIG. 2 of the drawings the operation is substantially the same as in FIG. 1 except that a loud siren-like sound will emanate from the loud speaker of the television receiver itself instead of the bell ringing.

In FIG. 2 the external wires, plugs and connections remain the same as in FIG. 1; the 2-wire electric supply cord 14*a*, 14*b* is connected to relay coil connections 9 and 10 and also to electric outlet 15. Cord 14*a*, 14*b* terminates and is connected to polarized electric plug 16 having prongs 17*a* and 17*b* which insert into a standard polarized electric outlet receptacle 18. The third connecting wire is designated 19*a* in this figure and it is similarly used to prevent the alarm from sounding in case of power failure as will be further described, and it is connected externally as wire 19 in FIG. 1.

Relay 8 with coil connections 9 and 10 in this case includes a double-pole, single throw contactor having one pair of contactor points 11 and 12 and a second pair of contactors 11*a* and 12*a*, both pairs of contactors are normally closed when the relay coil is not energized. Internal power supply is again designated as battery 13.

In FIG. 2 the bell is replaced by a transistorized audio signal generator such as a Cordover SM–1 siren module 30 having connections 31, 32 and 33 and utilizing the loud speaker 40 of the television set as the sound reproducer. 41 and 42 are the voice coil connections of the speaker and remain connected to the audio output of the television receiver as indicated.

In this figure grounded cord wire 14*a* is connected as shown to one side of battery 13, to terminal 32 of the siren module and to speaker voice coil terminal 42. The other battery connection is connected to terminal 31 of the module via relay contactor points 11 and 12 and the relay operates as in FIG. 1 to keep this circuit open so long as the relay is energized from the electric power source. In this case the grounded loop 14*a*–19 acts to shortout the output or speaker connections 32–33 of module 30 so that no sound will be emitted even during electric power failure unless circuit 14*a*–19 is broken or opened, as by cutting either wire or removing plug 16 or plug 21.

As apparent from following the circuit, the second set of relay contactors 11*a* and 12*a* remain open when the relay is energized and do not complete the circuit to the speaker voice coil by way of terminal 41 unless the relay is deenergized as by cutting wires 14*a* or 14*b* or removing plug 16. Only in such case is the speaker 40 connected to the output of the siren module. (Obviously the television receiver is then inoperative.)

Therefore, the arrangement in FIG. 2 as in the apparatus of FIG. 1, even in case of electric power failure the alarm will not sound unless the external wires are cut or plugs removed as would be required in any attempt to steal the television receiver.

Likewise, although ideally suited as a safeguard for television receivers, the device described could as readily be used to protect other electrically connected articles or objects.

Therefore, with the foregoing in mind, I do not wish to limit the scope of my invention.

Having thus described my invention, what I claim as novel and desire to secure by Letters Patent of the United States is:

1. An electric protective device for providing an alarm in the event of disconnection of the device from a house circuit having two leads, one of which is grounded, and which device is housed wholly in a cabinet containing other electrical apparatus also connected to the same house circuit, said protective device comprising a relay having a coil directly connectable to said house circuit thereby grounding one of the terminals of the coil, a self-contained source of current supply having two poles a first of which is connected to the grounded terminal of the coil, and an alarm means having two poles, said relay having a pair of normally closed contacts one of which is connected to the second pole of the battery and the other of which is connected to a first pole of the alarm means, the first pole of the battery being connected to the second pole of the alarm means, and means including a separate ground lead connected to the alarm means to render the alarm means ineffective so long as the coil and ground lead are connected to ground, regardless of power failure in the house circuit.

2. The device as set forth in claim 1 in which the alarm means includes an electromagnetic coil, an armature, and armature contacts opened and closed by vibration of said armature, said separate ground lead being connected to a coil terminal, said first pole of the alarm means being the other terminal of the coil.

References Cited

UNITED STATES PATENTS

| | | | |
|---|---|---|---|
| 2,632,155 | 3/1953 | Lamb | 340—224 X |
| 3,289,194 | 11/1966 | King | 340—28 |

JOHN W. CALDWELL, *Primary Examiner.*

D. L. TRAFTON, *Assistant Examiner.*